Figure 1:
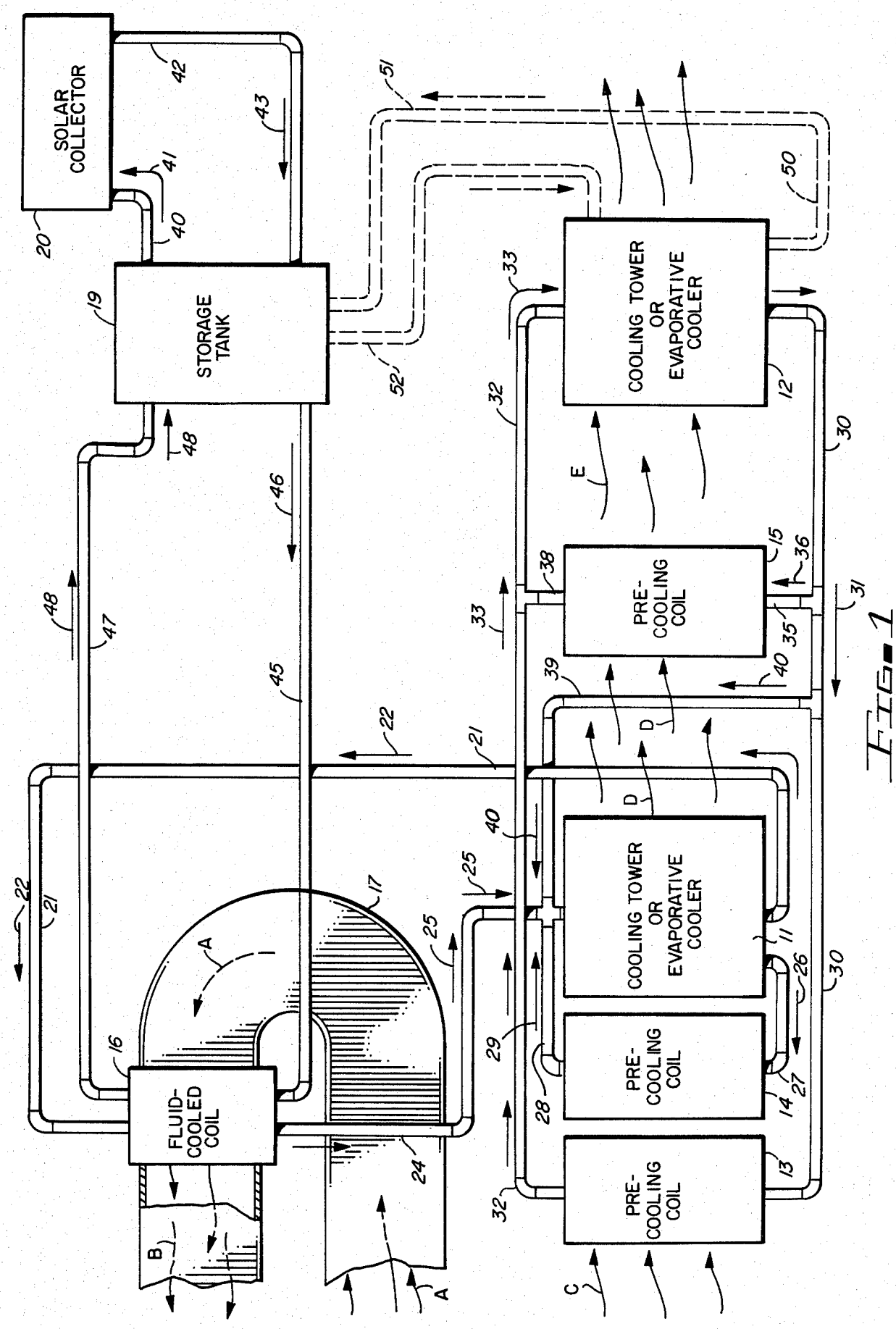

United States Patent [19]

Bock

[11] Patent Number: 4,538,426

[45] Date of Patent: Sep. 3, 1985

[54] AIR COOLING SYSTEM

[76] Inventor: Sumner D. Bock, 16225 N. 29th St., Space 25, Phoenix, Ariz. 85032

[21] Appl. No.: 531,348

[22] Filed: Sep. 12, 1983

[51] Int. Cl.³ .............................................. F28D 5/00
[52] U.S. Cl. ..................................... 62/310; 261/147; 261/151
[58] Field of Search ................ 62/304, 309, 310, 171; 261/140 R, 147, 151, 152; 165/60

[56] References Cited

U.S. PATENT DOCUMENTS 1,986,529  1/1935  Ray ...................................... 62/310
4,107,942  9/1978  Fairman ............................... 62/310

Primary Examiner—Henry Bennett
Attorney, Agent, or Firm—Drummond & Nissle

[57] ABSTRACT

An improved regenerative indirect evaporative and dry surface cooling system for conditioning the air in a structure.

15 Claims, 1 Drawing Figure

AIR COOLING SYSTEM

This invention relates to systems for conditioning the air in a structure.

More particularly, the invention pertains to a regenerative indirect evaporative and dry surface cooling system designed to cool outside air to dry bulb temperatures which are less than the wet bulb temperature of the outside air.

In another respect, the invention pertains to an air conditioning system of the type described in which cooled water produced by a cooling tower is utilized to pre-cool air entering the tower and to cool water entering a second cooling tower in the system.

In still another respect, the invention pertains to a regenerative indirect air conditioning system in which outside air is drawn over a dry surface cooling coil and directed into the interior of a structure to cool the same, air from inside the structure being utilized to regeneratively produce cool liquid which courses through the dry surface cooling coil.

In a further respect, the invention pertains to an air conditioning system of the type described in which outside air is precooled and passed through a multiple stage cooling tower to produce water which is coursed through a coil utilized to cool outside air passing into the interior of a structure.

Evaporative coolers are commonly used in arid regions of the American Southwest and represent a desirable method of cooling air because of their low cost of operation. However, since the cooling effectiveness of an evaporative cooler decreases or becomes non-existent as the humidity of the air being cooled increases, use of evaporative coolers is generally not practical in non-arid regions of the United States. Evaporative cooling units usually are also not able to cool ambient air to dry bulb temperatures less than the wet bulb temperature of the ambient air.

Conventional refrigeration units can quickly cool the interior of a structure, but they consume large quantities of electricity, particularly when ambient temperature and humidity are high. At high temperature and humidity the efficiency of a refrigeration unit may decrease by over fifty percent.

Accordingly, it would be highly desirable to provide an improved air conditioning system which would utilize an evaporative cooler and would function efficiently when the humidity of the ambient air was high.

It would also be highly desirable to provide an improved air conditioning system which utilized evaporative cooling and was able to cool ambient air to a dry bulb temperature less than the wet bulb temperature of the ambient air.

Therefore, it is a principal object of the invention to provide an improved system for conditioning air directed into the interior of a structure.

Another object of the invention is to provide an improved regenerative indirect evaporative and dry surface cooling system.

A further object of the invention is to provide an improved regenerative indirect dry surface air conditioning system which utilizes evaporative coolers and can be efficiently operated when the temperature and humidity of ambient air are high.

Still another object of the instant invention is to provide an improved air conditioning system of the type described which is designed to cool ambient air to a dry bulb temperature which is less than the wet bulb temperature of the ambient air.

Yet another object of the invention is to provide an improved regenerative indirect evaporative and dry surface cooling system in which outside air and air from the interior of a structure are precooled and passed through a two-stage cooling tower to produce water which is passed through a coil utilized to cool outside air being directed into the interior of the structure.

These and other, further and more specific objects and advantages of the invention will be apparent to those skilled in the art from the following detailed description thereof, taken in conjunction with the drawings, in which FIG. 1 is a schematic diagram illustrating an air conditioning system constructed in accordance with the principles of the invention.

Briefly, in accordance with one presently preferred embodiment of my invention, I provide an improved indirect evaporative and dry surface cooling system for conditioning the air in a structure. The cooling system includes a first evaporative heat exchange structure adapted to receive hot fluid to be cooled for lowering the temperature thereof; a second evaporative heat exchange structure adapted to receive hot fluid to be cooled for lowering the temperature thereof, the heat exchange structures each having air inlets and respective outlets communicating with a generally enclosed common plenum area; a first coil for pre-cooling air directed into the first evaporative heat exchange structure, the coil receiving cool fluid from the first evaporative heat exchange structure, the cool fluid coursing through the coil and absorbing heat from air directed over the coil into the first evaporative heat exchange structure; a second coil for pre-cooling air directed into the first evaporative heat exchange structure, the second coil receiving cool fluid from the second evaporative heat exchange structure, the cool fluid coursing through the second coil and absorbing heat from air directed over the second coil into the first evaporative heat exchange structure; fan means for directing air through the first and second pre-cooling coils and into and through the first evaporative heat exchange structure; and, a third coil for cooling air directed into the interior of the structure, the third coil receiving cool fluid from the first evaporative heat exchange structure, the cool fluid from the first evaporative heat exchange structure coursing through the third coil and absorbing heat from air directed over the third coil into the structure. The cool fluid passing through the first pre-cooling coil and absorbing heat from air passing through the coil may be recycled to the first evaporative heat exchange structure to be cooled. The cool fluid passing through the second pre-cooling coil and absorbing heat from air passing over the coil may be recycled to the second evaporative heat exchange structure to be cooled. Fan means may be included for directing exhaust air from the outlet of the first evaporative heat exchange structure through the second evaporative heat exchange structure. A fourth fluid-cooled coil may be included for pre-cooling air directed into the second evaporative heat exchange structure, cool fluid from the second evaporative heat exchange structure being coursed through said fourth pre-cooling coil to pre-cool air directed into the second evaporative heat exchange structure. Exhaust air from the outlet of the first evaporative heat exchange structure may be directed through the fourth pre-cooling coil and into and through the second evaporative heat exchange structure. Fluid which has passed through the fourth pre-cooling coil and absorbed heat may be recycled to the second evaporative heat exchange structure to be cooled. Cool fluid from the second heat exchange structure may be mixed with fluid which has passed through the third fluid cooling coil before the fluid from the third coil is returned to the first evaporative heat exchange structure for cooling. Fluid from the first pre-cooling coil may, before warmed fluid from the third fluid-cooled coil is recycled through the first evaporative heat exchange structure to be cooled, be mixed with warm fluid from the third coil. Fan means may be utilized to direct outside air through the first and second pre-cooling coils and into the first evaporative heat exchange structure. Fan means may be utilized to direct air from the interior of the structure through the first and second pre-cooling coils into the first evaporative heat exchange structure. Fan means may be utilized to direct a combination of outside air and air from the interior of the structure through the first and second pre-cooling coils into the first evaporative heat exchange structure. Fan means may be provided for directing outside air over the third cooling coil into the structure. Fan means may be provided for directing a combination of outside air and air from the interior of the structure over the third cooling coil into the structure.

Turning now to the drawings, in which the presently preferred embodiments of the invention are shown for the purpose of illustrating the practice thereof and not by way of limitation of the scope of the invention, a regenerative indirect evaporative and dry surface cooling and heating system is illustrated including cooling tower or evaporative cooler 11, cooling tower or evaporative cooler 12, pre-cooling coils 13, 14 for evaporative heat exchange structure 11, pre-cooling coil 15 for evaporative heat exchange structure 12, fluid-cooled coil 16, ducting 17 for directing air into and through coil 16, storage tank 19 and solar heat collector 20. Cooled fluid, usually water, from heat exchange structure 11 travels through conduit length 21 in the direction indicated by arrows 22 to coil 16. Warm air indicated by arrows A passes through coil 16 while cool fluid from conduit 21 courses through fluid-cooled coil 16. The cooled air from coil 16 indicated by arrows B is directed into a structure. The warm air indicated by arrows A may be outside air, air from the interior of the structure, or a combination of outside air and air from the interior of the structure. Warmed water from coil 16 travels through conduit length 24 in the direction of arrows 25 back to evaporative heat exchange structure 11 to be cooled.

Cooled fluid from evaporative heat exchange structure 11 travels through conduit length 27 in the direction of arrow 26 to pre-cooling coil unit 14. Warm air indicated by arrows C is directed through coils 13, 14 and into and through evaporative heat exchange structure 11. The air indicated by arrows C may be outside air, air from the interior of the structure, or a combination of outside air and air from the interior of the structure. Exhaust air from structure 11 is indicated by arrows D. Warmed fluid from pre-cooling coil 14 travels along conduit 28 in the direction of arrow 29 and is intermixed with warm fluid from coil 16 before the fluid from coils 14, 16 is directed back into structure 11 to be cooled.

Cooled fluid, typically water, from evaporative heat exchange structure 12 travels through conduit length 30 in the direction indicated by arrow 31 to coil 14. Warmed fluid from coil 14 travels through conduit length 32 in the direction of arrows 33 to evaporative heat exchange structure 12 to be cooled.

A portion of the cool fluid moving through conduit 30 is directed through conduit 35 in the direction of arrow 36 to pre-cooling coil 15. Exhaust air indicated by arrows D from evaporative heat exchange structure 11 is directed through coil 15 into evaporative heat exchange structure 12 as represented by arrows E. Warmed fluid from coil 15 travels through conduit 38 into conduit length 32 and back to evaporative heat exchange structure 12.

Another portion of cool fluid moving through conduit 30 is diverted into conduit 39 in the direction of arrows 40 to conduit 24 to be mixed with warm fluid from coil 16 before the fluid from conduits 24, 39 is directed into evaporative heat exchange structure 11. Excess fluid which accumulates in structure 11 as the result of fluid added through conduit 39 may be bled off or returned to heat exchange structure 12.

Fluid from thermal storage tank 19 is directed through conduit 40 in the direction of arrow 41 to solar heat collector 20. Heated fluid from collector 20 moves through conduit 42 in the direction of arrow 43 to tank 19. When it is desired to utilize coil unit 16 to heat the air represented by arrows A as the air passes through unit 16, the flow of cool fluid through coil 16 from conduit 21 is stopped and warm fluid from conduit 45 is instead permitted to pass through coil unit 16. Fluid from conduit 45 passes through coil unit 16 into conduit 47 and is returned to tank 19. Warm fluid from tank 19 travels to coil 16 through conduit 45 in the direction of arrow 46.

Coil unit 16 preferably includes two separate flow-through coils, one coil through which fluid from conduit 21 courses to conduit 24, and a second coil through which fluid from conduit 45 courses to conduit 47. This permits coil unit 16 to be readily utilized for heating by permitting fluid to move through conduits 45, 47 while halting the flow of fluid through conduits 21, 24. Similarly, coil 16 is utilized for cooling by halting the flow of fluid through conduits 45, 47 while permitting fluid to move through conduits 21, 24.

To improve the cooling efficiency of the system of the drawing, the flow of fluid from tank 19 to collector 20 may be interrupted and tank 19 instead utilized to store cooled fluid from heat exchange structure 12. When storage tank 19 is being utilized to store cool fluid, fluid from heat exchange structure 12 flows through conduit 50 in the direction indicated by arrow 51 to tank 19. Warm fluid from tank 19 is directed through conduit 52 in the direction of arrow 53 to heat exchange structure 12 to be cooled. If coil 16 is being utilized to cool the air indicated by arrows A, then cool fluid from tank 19 can be directed into conduit 45 and through one coil in unit 16 to conduit 47 while cool fluid from structure 11 is directed through conduit 21 and the other flow-through coil in unit 16. Cool fluid from structure 12 may also travel from unit 12 through a conduit directly into conduit 45 and coil 16 and then be returned directly to unit 12 after passing through unit 12.

For the sake of clarity, fans, pumps and valving have been omitted from the drawings. As would be appreciated by those of skill in the art, a variety of fan, pump and valve combinations could be utilized to achieve the desired air and fluid flows shown in the drawing and described above.

In order to further illustrate the cooling capabilities of the system of the invention, an example will be provided in which only outside air is directed into coils 13, 16 of the system illustrated in the drawings. In particular, if the outside air has a 95° F. dry bulb temperature, 75° F. wet bulb temperature and 40% relative humidity, then unit 12 and coil unit 13 are sized such that outside air which is represented by arrows C and directed into unit 13 is cooled from 95° F. to a dry bulb temperature of 76° F. Air passing from coil 13 into coil 14 therefore has a dry bulb temperature of 76° F. Pre-cooling coil 14 is sized such that air passing therethrough into evaporative heat exchange structure 11 is cooled from 76° F. to a dry bulb temperature of 60° F. Exhaust air represented by arrows D from structure 11 has a dry bulb temperature of 80° F. and on passing through coil 15 is cooled to a dry bulb temperature of 76° F. Thus, air which is represented by arrows E and enters evaporative cooling structure 12 has a dry bulb temperature of 76° F. Cool water produced by units 12 and directed through conduits 30, 36, 39 has a temperature of 72° F. Cool water produced by unit 11 and passing into conduit lengths 21, 27 has a temperature of 55° F. Warm water traveling from coil 13 into conduit 32 has a temperature of 92° F.; from coil 14 into conduit 28 has a temperature of 80° F.; and, from coil 16 into conduit 24 has a temperature of 88° F. When the air which is represented by arrows A and directed through coil 16 has a dry bulb temperature of 95° F., wet bulb temperature of 75° F. and relative humidity of 40%, the cool air represented by arrows D and produced by coil 16 has a 60° F. dry bulb temperature, 52° F. wet bulb temperature and relative humidity of 60%.

As earlier noted, air which is represented by arrows A and directed into coil 16 may be comprised of outside air only, of a combination of outside air and air from the interior of a structure, or of only air from the interior of a structure. Since air recycled from the interior of a structure into coil 16 is normally substantially cooler than outside air, the use of air from the interior of a structure as part or all of the air stream represented by arrows A would, assuming the other variables described in the above example remained substantially constant, produce air represented by arrows B having a dry bulb temperature less than the 60° F. noted in the example. Air from the interior of a structure may similarly be utilized as part or all of the air stream represented by arrows C.

Having described my invention in such terms as to enable those skilled in the art to understand and practice it, and having identified the presently preferred embodiments thereof, I claim:

1. An indirect evaporative and dry surface cooling system for conditioning the air in a structure, said system including
    (a) A first evaporative heat exchange structure adapted to receive hot fluid to be cooled for lowering the temperature thereof;
    (b) a second evaporative heat exchange structure adapted to receive hot fluid to be cooled for lowering the temperature thereof, said heat exchange structures each having air inlets and respective outlets;
    (c) a first coil for pre-cooling air directed into said first evaporative heat exchange structure, said coil receiving cool fluid from said first evaporative heat exchange structure, said cool fluid coursing through said coil and absorbing heat from air directed over said coil into said first evaporative heat exchange structure;
    (d) a second coil for pre-cooling air directed into said first evaporative heat exchange structure, said second coil receiving cool fluid from said second evaporative heat exchange structure and receiving cooled air from said first coil, said cooled fluid from said second evaporative heat exchange structure coursing through said second coil and absorbing heat from air directed over said second coil into said first evaporative heat exchange structure;
    (e) fan means for directing air through said first and second pre-cooling coils and into and through said first evaporative heat exchange structure; and
    (f) a third coil for cooling air directed into the interior of said structure, said interior air third coil receiving cool fluid from said first evaporative heat exchange structure, said cool fluid from said first evaporative heat exchange structure coursing through said third coil and absorbing heat from air directed over said third coil into said structure.

2. The system of claim 1 wherein said cool fluid passing through said pre-cooling coil and absorbing heat from air passing over said coil is recycled to said first evaporative heat exchange structure to be cooled.

3. The system of claim 2 where said cool fluid passing through said second pre-cooling coil and absorbing heat from air passing over said coil is recycled to said second evaporative heat exchange structure to be cooled.

4. The system of claim 3 including fan means for directing exhaust air from said outlet of said first evaporative heat exchange structure through said second evaporative heat exchange structure.

5. The system of claim 4 including a fourth fluid-cooled coil for pre-cooling air directed into said second evaporative heat exchange structure, cool fluid from said second evaporative heat exchange structure being coursed through said fourth pre-cooling coil to pre-cool said air directed into said second evaporative heat exchange structure.

6. The system of claim 5 where exhaust air from said outlet of said first evaporative heat exchange structure is directed through said fourth pre-cooling coil and into and through said second evaporative heat exchange structure.

7. The system of claim 6 where fluid which has passed through said fourth pre-cooling coil and absorbed heat is recycled to said second evaporative heat exchange structure to be cooled.

8. The system of claim 7 wherein cool fluid from said second heat exchange structure is mixed with fluid which has passed through said third fluid cooling coil before said fluid from said third coil is returned to said first evaporative heat exchange structure for cooling.

9. The system of claim 8 wherein fluid from said first pre-cooling coil is, before warmed fluid from said third fluid cooled coil is recycled through said first evaporative heat exchange structure to be cooled, mixed with said warmed fluid from said third water-cooled coil.

10. The system of claim 1 wherein said fan means directs outside air through said first and second pre-cooling coils and into said first evaporative heat exchange structure.

11. The system of claim 1 wherein said fan means directs air from the interior of said structure through said first and second pre-cooling coils and into said first evaporative heat exchange structure.

12. The system of claim 1 wherein said fan means directs a combination of outside air and air from the interior of said structure through said first and second pre-cooling coils and into said first evaporative heat exchange structure.

13. The system of claim 1 including fan means for directing outside air over said third coil into said structure.

14. The system of claim 1 including fan means for directing a combination of outside air and air from the interior of said structure over said third coil into said structure.

15. The system of claim 9 wherein air passing through said second pre-cooling coil is cooled to a temperature of 60° F.

* * * * *